United States Patent
Young et al.

(10) Patent No.: US 11,992,756 B2
(45) Date of Patent: May 28, 2024

(54) PERSONALIZED VR CONTROLS AND COMMUNICATIONS

(71) Applicant: SONY INTERACTIVE ENTERTAINMENT LLC, San Mateo, CA (US)

(72) Inventors: Kristine Young, San Mateo, CA (US); Tatianna Manzon-Gutzman, San Mateo, CA (US); Rui Yang, San Mateo, CA (US); Hsin-Yi Chien, San Mato, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 220 days.

(21) Appl. No.: 17/510,586

(22) Filed: Oct. 26, 2021

(65) Prior Publication Data
US 2023/0128658 A1    Apr. 27, 2023

(51) Int. Cl.
| | |
|---|---|
| *G06F 3/01* | (2006.01) |
| *A63F 13/213* | (2014.01) |
| *A63F 13/42* | (2014.01) |
| *G06F 3/04883* | (2022.01) |
| *G06F 3/16* | (2006.01) |
| *G06K 9/00* | (2022.01) |
| *G06T 11/60* | (2006.01) |
| *G06T 13/40* | (2011.01) |
| *G06V 20/62* | (2022.01) |
| *H04L 65/613* | (2022.01) |
| *H04L 65/75* | (2022.01) |

(52) U.S. Cl.
CPC ............ *A63F 13/42* (2014.09); *A63F 13/213* (2014.09); *G06F 3/04883* (2013.01); *G06F 3/165* (2013.01); *G06T 11/60* (2013.01); *G06V 20/635* (2022.01); *H04L 65/613* (2022.05); *H04L 65/762* (2022.05)

(58) Field of Classification Search
CPC .......... G06F 3/011; G06F 3/012; G06F 3/013; G06F 3/017; G06F 3/0425; G06F 3/04842; G06F 3/04883; A63F 13/428; G02B 27/0093; G06T 19/006; G06T 2219/024; G06V 20/20; G06V 40/20; H04L 12/1822
See application file for complete search history.

(56) References Cited

U.S. PATENT DOCUMENTS

| | | | |
|---|---|---|---|
| 2019/0362557 A1* | 11/2019 | Lacey | G06F 3/017 |
| 2021/0124422 A1* | 4/2021 | Forsland | G06F 3/016 |
| 2021/0373672 A1* | 12/2021 | Schwarz | G06V 40/28 |

* cited by examiner

*Primary Examiner* — Lawrence S Galka
(74) *Attorney, Agent, or Firm* — Polsinelli LLP

(57) ABSTRACT

Systems and methods for personalized controls and communications in virtual environments are provided. A virtual reality (VR) profile may be stored in memory for a user. Such VR profile may specify a cue associated with custom instructions executable to modify one or more virtual display elements. An interactive session associated with a virtual environment in which the user is participating via a user device may be monitored based on the VR profile stored for the user. The cue specified by the VR profile may be detected as being present in the monitored communication session. The virtual elements may be modified within a presentation of the virtual environment provided to the user device in accordance with the executable instructions associated with the cue specified by the VR profile of the user.

17 Claims, 6 Drawing Sheets

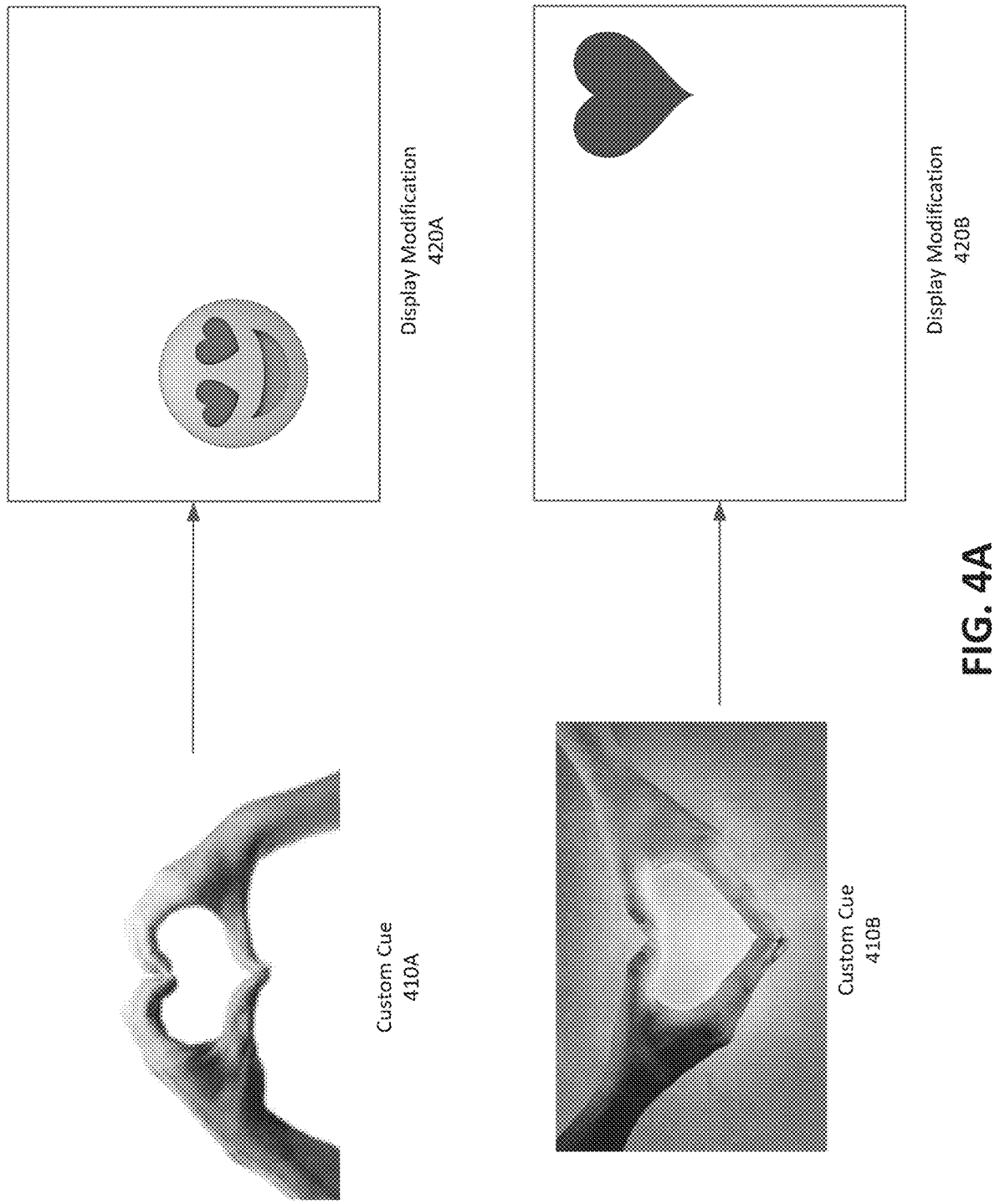

PERSONALIZED VR CONTROLS AND COMMUNICATIONS

BACKGROUND OF THE INVENTION

1. Field of the Invention

The present invention generally relates to digital controls and communications. More specifically, the present invention relates to personalized controls and communications in virtual environments.

2. Description of the Related Art

Presently available virtual reality (VR) systems may present digital content including audio-visual and other types of data in a virtual environment. Various game titles and other types of virtual applications may therefore involve using a virtual reality device to generate the virtual environment, as well as update the virtual environment responsive to detectable actions by the user or player. For example, playing an interactive game title may involve presenting a variety of different audio-visual effects within an associated virtual environment. Further, such virtual environments may support a variety of different in-game scenarios in which players (through their respective avatars or characters) are able to engage in a variety of different types of activities and exercise a variety of in-game skills. The player may generally control their avatar using one or more types of controllers. Such controllers may include any combination of computing device controllers (e.g., keyboard, keypad, mouse, touchpad, touchscreen), game controllers and controller modifications (e.g., buttons, touchpads, sensors, microphones, etc.) in different configurations and layouts, and VR controllers (e.g., head-mounted display, VR headsets, VR goggles, VR projectors) and associated system cameras and sensors.

Different combinations of user input (e.g., sequence or synchronization of button presses, touchpad and other gestures, verbal commands, or other input) may be required to perform different types of in-game moves, maneuvers, or other exercise of in-game action. Because different game titles may include different activities, the specific input combinations may result in different in-game moves. In addition, entering an input combination incorrectly may result in a different in-game action than the one intended by the player.

Such variety and complexity of in-game actions and of controllers may therefore represent barriers to entry when players are introduced to a new or unfamiliar game title, controller, or game console system. A new or inexperienced player may therefore find gameplay in virtual environments difficult, frustrating, or time-consuming to navigate. Such challenges may be further exacerbated for players with disabilities.

There is, therefore, a need in the art for improved systems and methods of personalized controls and communications in virtual environments.

SUMMARY OF THE CLAIMED INVENTION

Embodiments of the present invention include systems and methods for personalized controls and communications in virtual environments. A virtual reality (VR) profile may be stored in memory for a user. Such VR profile may specify a cue associated with custom instructions executable to modify one or more virtual display elements. An interactive session associated with a virtual environment in which the user is participating via a user device may be monitored based on the VR profile stored for the user. The cue specified by the VR profile may be detected as being present in the monitored communication session. The virtual elements may be modified within a presentation of the virtual environment provided to the user device in accordance with the executable instructions associated with the cue specified by the VR profile of the user.

BRIEF DESCRIPTION OF THE DRAWINGS

FIG. 4A is a diagram illustrating exemplary implementations of specific personalized controls and communications in virtual environments.

DETAILED DESCRIPTION

Embodiments of the present invention include systems and methods for personalized controls and communications in virtual environments. A virtual reality (VR) profile may be stored in memory for a user. Such VR profile may specify a cue associated with custom instructions executable to modify one or more virtual display elements. An interactive session associated with a virtual environment in which the user is participating via a user device may be monitored based on the VR profile stored for the user. The cue specified by the VR profile may be detected as being present in the monitored communication session. The virtual elements may be modified within a presentation of the virtual environment provided to the user device in accordance with the executable instructions associated with the cue specified by the VR profile of the user.

Figure 1:
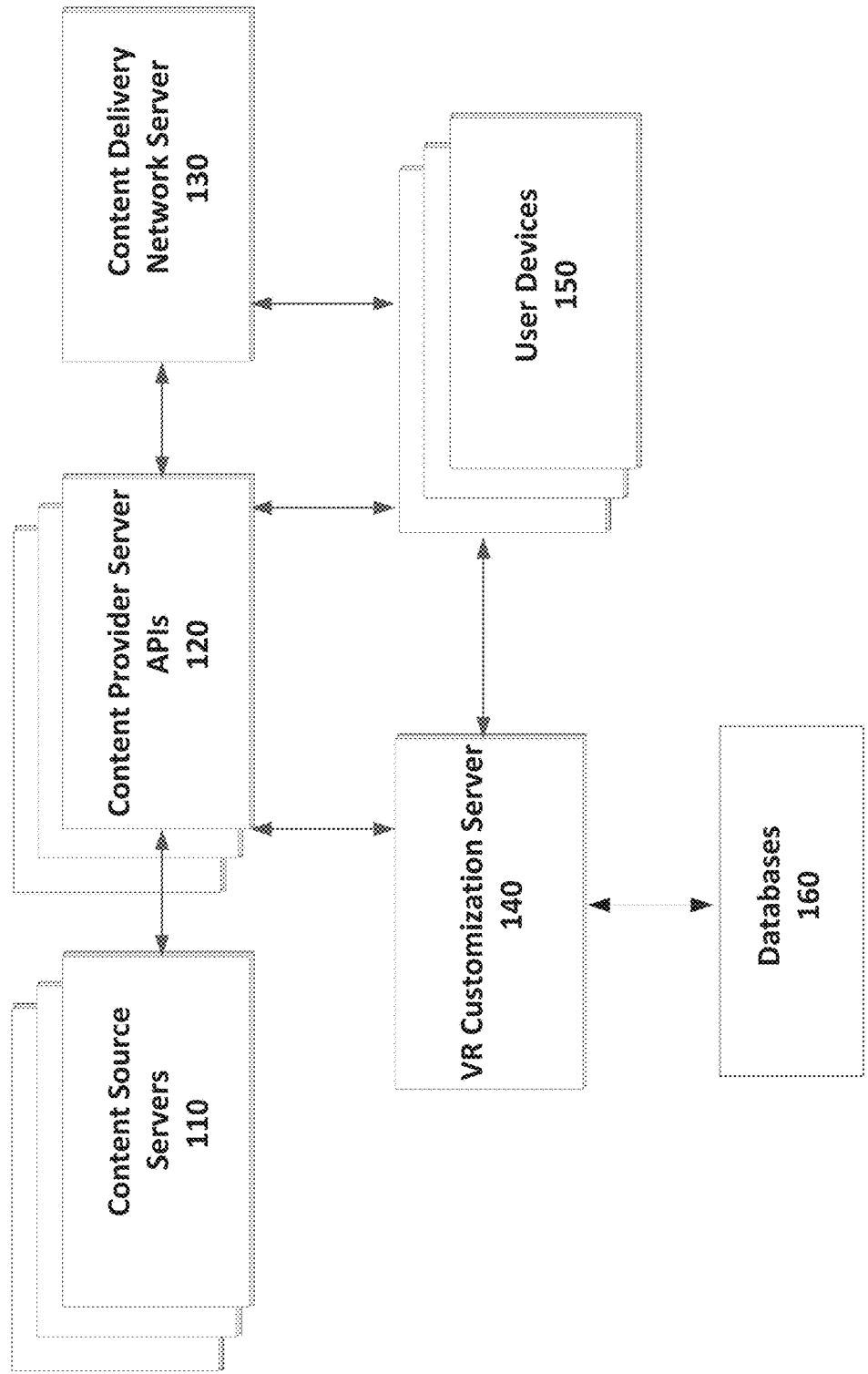
FIG. 1 illustrates a network environment in which a system for personalized controls and communications in virtual environments may be implemented.

FIG. 1 illustrates a network environment 100 in which a system for personalized controls and communications in virtual environments may be implemented. The network environment 100 may include one or more content source servers 110 that provide digital content (e.g., games, other applications and services) for distribution, one or more content provider server application program interfaces (APIs) 120, content delivery network server 130, VR customization server 140, and one or more user devices 150. The devices in network environment 100 communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of digital content and digital services available for distribution over a communication network. The content source servers 110 may be associated with any content provider that makes its content available for access over a communication network. The content source servers 110 may therefore host a variety of different content titles, which may further have be associated with object data regarding a digital or virtual object (e.g., activity information, zone information, character information, player information, other game media information, etc.) displayed in a digital or virtual environment during an interactive session.

Such content may include not only digital video and games, but also other types of digital applications and services that can be provided within virtual environments. Such applications and services may include any variety of different digital content and functionalities that may be provided to user devices 150, including providing and supporting chat and other communication channels. The chat and communication services may be inclusive of voice-based, text-based, and video-based messages. Thus, a user device 150 may participate in a gameplay session concurrent with one or more communication sessions, and the gameplay and communication sessions may be hosted on one or more of the content source servers 110.

The content from content source server 110 may be provided through a content provider server API 120, which allows various types of content source servers 110 to communicate with other servers in the network environment 100 (e.g., user devices 150). The content provider server API 120 may be specific to the particular operating language, system, platform, protocols, etc., of the content source server 110 providing the content, as well as the user devices 150 and other devices of network environment 100. In a network environment 100 that includes multiple different types of content source servers 110, there may likewise be a corresponding number of content provider server APIs 120 that allow for various formatting, conversion, and other cross-device and cross-platform communication processes for providing content and other services to different user devices 150, which may each respectively use different operating systems, protocols, etc., to process such content. As such, applications and services in different formats may be made available so as to be compatible with a variety of different user device 150. In a network environment 100 that includes multiple different types of content source servers 110, content delivery network servers 130, VR customization 140, user devices 150, and databases 160, there may likewise be a corresponding number of APIs managed by content provider server APIs 120.

The content provider server API 120 may further facilitate access of each of the user devices 150 to the content hosted or services provided by the content source servers 110, either directly or via content delivery network server 130. Additional information, such as metadata, about the accessed content or service can also be provided by the content provider server API 120 to the user device 150. As described below, the additional information (e.g., object data, metadata) can be usable to provide details about the content or service being provided to the user device 150. In some embodiments, the services provided from the content source servers 110 to the user device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to user devices 150. The content delivery network server 130 can also be called upon by the user devices 150 that request to access specific content or services. Content delivery network server 130 may include universe management servers, game servers, streaming media servers, servers hosting downloadable content, and other content delivery servers known in the art.

VR customization server 140 may include any data server known in the art that is capable of communicating with the different content source servers 110, content provider server APIs 120, content delivery network server 130, user devices 150, and databases 160. Such VR customization server 140 may be implemented on one or more cloud servers that carry out instructions associated with interactive content (e.g., games, activities, video, podcasts, User Generated Content ("UGC"), publisher content, etc.). The VR customization servers 140 may further carry out instructions, for example, for monitoring one or more audio streams based on a VR profile. Specifically, the VR customization server 140 may monitor an interactive session associated with a virtual environment for one or more cues specified by the VR profile. When the specified cues are detected, the VR customization server 140 may apply one or more modifications to virtual display elements in the virtual environment.

The user device 150 may include a plurality of different types of computing devices. The user device 150 may be a server that provides an internal service (e.g., to other servers) in network environment 100. In such cases, user device 150 may correspond to one of the content servers 110 described herein. Alternatively, the user device 150 may be a computing device that may include any number of different gaming consoles, mobile devices, laptops, and desktops. Such user devices 150 may also be configured to access data from other storage media, such as, but not limited to memory cards or disk drives as may be appropriate in the case of downloaded services. Such user devices 150 may include standard hardware computing components such as, but not limited to network and media interfaces, non-transitory computer-readable storage (memory), and processors for executing instructions that may be stored in memory. These user devices 150 may also run using a variety of different operating systems (e.g., iOS, Android), applications or computing languages (e.g., C++, JavaScript). An exemplary client device 150 is described in detail herein with respect to FIG. 5. Each user device 150 may be associated with participants (e.g., players) or other types (e.g., spectators) of users in relation to a collection of digital content streams. The user device 130 may include one or more peripheral devices that allow the user to interact with a virtual environment, such as a head-mounted display, VR headset, VR goggles, VR projectors, cameras, sensors (including wearable sensors), etc.

While pictured separately, the databases 160 may be stored on any of the servers and devices illustrated in network environment 100 on the same server, on different servers, or on any of the user devices 150. Such databases 160 may store or link to various sources and services used for VR customizations and modifications. In addition, databases 160 may store VR profiles, as well as VR customization instructions that may be available to a particular user, user group or team, user category, game title, game genre, sound types, etc. One or more VR profiles may also be stored in the databases 160 for each user. In addition to gameplay data regarding the user (e.g., user progress in an activity and/or media content title, user ID, user game characters, etc.), the VR profile for a user may include one or more specified cues associated with executable instructions for making modifications to virtual display elements in the virtual environment.

For example, the VR profile may specify a custom cue that corresponds to an individual user input or a specific and ordered combination of user inputs. The custom cue may include any combination of verbal cue, physical gesture, or other user input. For example, the user may perform the physical gesture of making the shape of a heart with their hands such as illustrated by user cues 410A-B in FIG. 4A, or the user may draw shapes in the air or on a touchpad. As such, a real-world environment of the user may be monitored during an interactive session to identify when the custom cue is given. Based on the type(s) of input associated with the custom cue, user device 150 (or associated cameras, microphones, touchpads, sensors, other input devices and peripherals) may capture data indicative of the same and provide to VR customization server 140 for analysis and determination of whether any activity in the real-world environment matches the custom cue defined by the stored VR profile.

The custom cue may be specific to the user, who may be allowed to define what constitutes the custom cue as well as the associated instructions for modifying display elements within the virtual environment. The user may further specify the type of modifications to apply to the virtual display elements. Such modifications may include generating new display elements, changing part of elements in the current display, or removing display elements from the display. Referring to the above example, the user may have defined the custom cue as creating the shape of heart with their hands, and the associated modification may be to generate a heart emoji in a portion or location within the virtual environment where eye-tracking data indicates that the user was looking when the custom cue was detected. The VR customization server 140 may therefore use shape recognition to detect when data regarding the real-world environment indicates that a heart shape was created by the user's hands. Rather than typing out text or emoticons or searching keyboards for the right emoji, the user may simply use the custom cue to generate and place a virtual display element as desired within the virtual environment. By facilitating certain controls and communications in the virtual environment, the VR customization server 140 may therefore streamline the user experience and allow the user to focus on other activities such as learning about the virtual environment and improving gameplay.

The display elements may be identified as specific display elements (e.g., a specific game character or in-game object) or may be identified based on predefined conditions or factors. For example, the display elements may be based on a current line-of-sight of the user as the custom cue was given. The line-of-sight of the user may be identified using eye-tracking systems during the interactive session. As such, VR customization server 140 may identify that when the custom cue was given by the user, the user line-of-sight was focused on an identified portion of the virtual environment. The identified portion—and any virtual display elements present therein—may therefore be selected for modification in accordance with the instructions specified by VR profile of the user as being associated with the custom cue.

In some implementations, the virtual display elements may include user input interfaces within the virtual environment, including menus, virtual keyboards, virtual keypads, virtual buttons, etc. The user may specify a custom cue to launch such user input interfaces, as well as custom cues for entering new input using the user input interfaces. As discussed above, user line-of-sight may be used to identify specific virtual display elements to modify, which may be used to provide virtual typing based on eye-tracking or gestures (e.g., drawing letters in the air, handwriting on a touchpad, pointing or swiping letters in the virtual keyboard). Instead of physical keyboards or keypads, therefore, such a virtual user input interface allows the user to input text efficiently while engaged in active gameplay within an immersive virtual environment.

The user may also specify that certain custom cues may come from their peers. For example, the user may have certain aesthetic, sensory, or experiential preferences for how communications from their peers are presented in virtual environments. For example, a user who may wish to avoid text-based communications during an interactive session may define the custom cue as text from a peer user, as well as define the associated modification as removing the text from the virtual environment and instead generating and playing voiceover audio corresponding to the content of the text.

Figure 2:
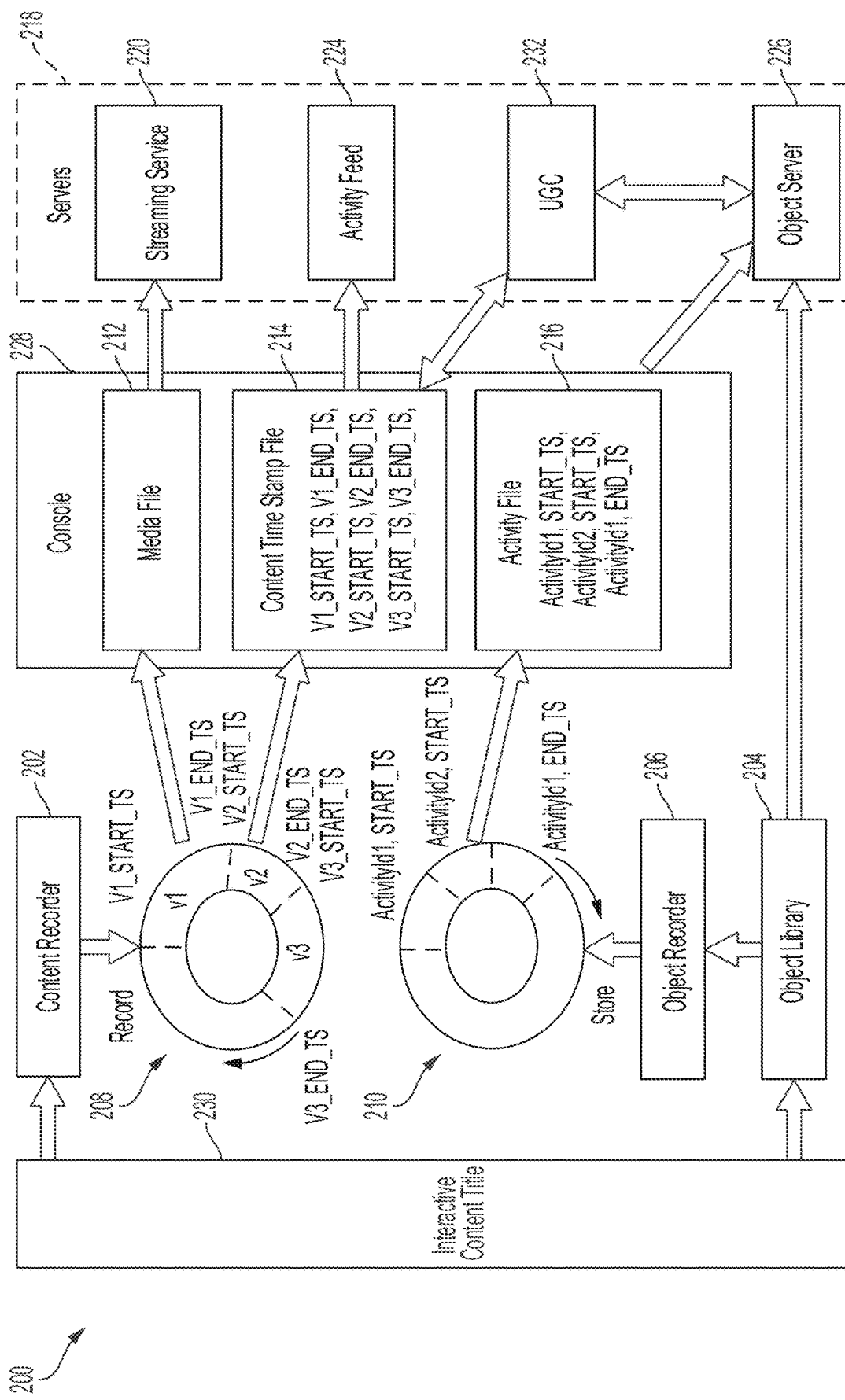
FIG. 2 illustrates an exemplary uniform data system (UDS) that may be used to provide data to a system for personalized controls and communications in virtual environments.

FIG. 2 illustrates an exemplary uniform data system (UDS) 200 that may be used to provide data to a system for personalized controls and communications in virtual environments. Based on data provided by UDS 200, translation filter server 140 can be made aware of the current session conditions, e.g., what in-game objects, entities, activities, and events that users have engaged with, and thus support analysis of and coordination of translation and filtration by translation filter server 140 with current gameplay and in-game activities. Each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

For example, various content titles may depict one or more objects (e.g., involved in in-game activities) with which a user can interact and/or UGC (e.g., screen shots, videos, commentary, mashups, etc.) created by peers, publishers of the media content titles and/or third party publishers. Such UGC may include metadata by which to search for such UGC. Such UGC may also include information about the media and/or peer. Such peer information may be derived from data gathered during peer interaction with an object of an interactive content title (e.g., a video game, interactive book, etc.) and may be "bound" to and stored with the UGC. Such binding enhances UGC as the UGC may deep link (e.g., directly launch) to an object, may provide for information about an object and/or a peer of the UGC, and/or may allow a user to interact with the UGC.

As illustrated in FIG. 2, an exemplary console 228 (e.g., a user device 130) and exemplary servers 218 (e.g., streaming server 220, an activity feed server 224, an user-generated content (UGC) server 232, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224 and/or the UGC server 232, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object beings and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., competitive match, quest, task, etc.), user or peer data related to the activity. For example, an object file 216 may store data regarding an item used during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214.

In exemplary embodiments, the media files 212 and activity files 216 may provide information to VR customization server 140 regarding current session conditions, which may also be used to identify virtual display objects located at different locations or portions within the virtual environment that may be subject to modification in accordance with the VR profile of the user. VR customization server 140 may therefore use such media files 212 and activity files 216 to identify specific players, characters, and objects at specific locations relative to the user and their line-of-sight. Based on such files 212 and 216, for example, VR customization server 140 may identify that the user was looking at a specific virtual object in the virtual environment when the custom cue was detected. Thus, the virtual object may be identified by the VR customization server 140 as being subject to modification in accordance with the instructions associated with the custom cue by the VR profile of the user.

Figure 3:
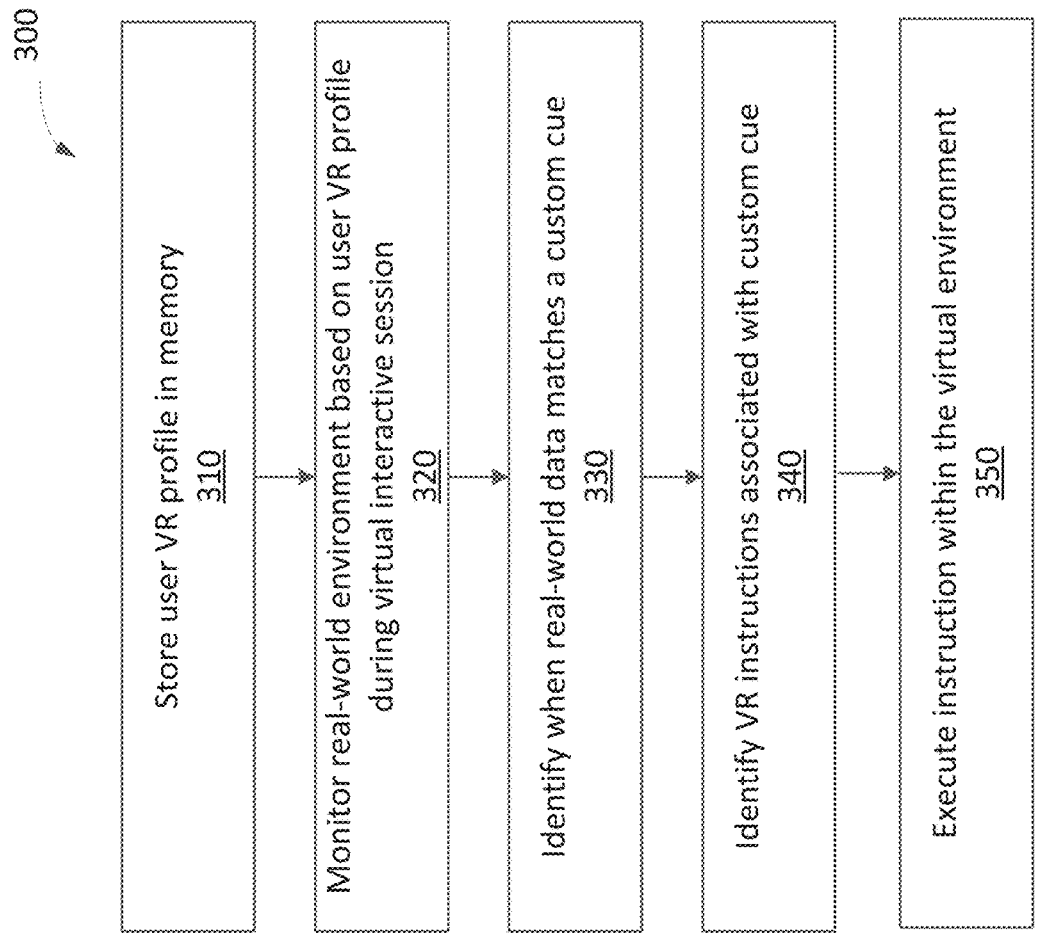
FIG. 3 is a flowchart illustrating an exemplary method for personalized controls and communications in virtual environments.

FIG. 3 is a flowchart illustrating an exemplary method 300 for personalized controls and communications in virtual environments. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, a VR profile may be stored in memory (e.g., databases 160). The VR profile may be specific to a particular user (or group of users) and may include a custom cue associated with instructions for modifying one or more virtual display elements. The custom cue may include any combination of detectable input actions by the user in a real-world environment. The virtual display elements identified for modification may include virtual display elements currently present in the virtual environment or new virtual display elements to generate and place within the virtual environment.

In step 320, a real-world environment associated with the user device 150 may be monitored by VR customization server 140 in accordance with the VR profile. during an interactive session. VR customization server 140 therefore does not only monitor the virtual environment itself, but also data regarding user activity in the real-world. Such data may be captured by one or more user devices 150 or associated cameras, sensors, and other input devices.

In step 330, a real-world input may be determined to match a custom cue of the VR profile. In particular, the VR customization server 140 analyzes captured real-world data to detect when such data indicates the appearance of the custom cue(s) defined by the VR profile. Depending on the type of custom cue defined by the VR profile, such analysis by VR customization server 140 may include voice recognition, word recognition, shape recognition, face recognition, and other analytical tools for matching real-world data to stored custom cues. Where the custom cue is defined as particular physical gesture (e.g., thumbs up), for example, VR customization server 140 may analyze the captured real-world data to identify when a shape (or series of shapes) corresponding to the physical gesture is detected.

In step 340, the VR customization server 140 may identify and retrieve the modification instructions associated with the detected custom cue. Such instructions may be executable to modify one or more virtual display elements for presentation within the virtual environment. As discussed above, such modifications may include generating new virtual display elements to add the virtual environment, changing existing virtual display elements within the virtual environment, or removing existing virtual display elements from the virtual environment. Referring to the example of the thumbs-up gesture noted above, the associated modification may update the virtual environment with a "Like" indicator.

In step 350, a display of the virtual display elements within the virtual environment may be modified in real-time or close to real-time. One or more participants of the interactive session (including or excluding the user of user device 150 that specified the custom cue and associated modification) may therefore be presented with the modified display elements within the virtual environment. Referring again to the example of the thumbs-up gesture, the "Like" indicator may be generated within the virtual environment. Further, the "Like" indicator may be placed based on the user line-of-sight when the custom cue was detected. For example, the user line-of-sight may be focused on an identified location where an virtual display element appears within the virtual environment. The "Like" indicator may be placed proximate to or otherwise in association with the identified virtual display element. The user may continue to specify refinements and other changes to the VR profile over time, which allows for VR modifications to be applied to future interactive sessions in a manner that better reflects the user's preferences and priorities.

FIG. 4A is a diagram illustrating exemplary implementations of specific personalized controls and communications in virtual environments. Different custom cues 410A-B may be defined by different users and stored in their respective VR profiles. As illustrated, one user may define a custom cue 410A as creating a shape of a heart with their hands in which their thumbs form the bottom of the heart and the remaining fingers form the top of the heart. A different user may define a custom cue 410B as creating a shape of a heart with their hands in which their thumbs form the top of the heart and the remaining fingers form the bottom of the heart.

Each user may further specify different display modifications 420A-B as being associated with their respective custom cues 410A-B. For example, one user may specify that their custom cue 410A (heart with thumbs on the bottom) as triggering a display modification in which an emoji with heart eyes is generated and added to the virtual environment. The other user may specify, however, that their custom cue 410B (heart with thumbs on top) triggers a display modification in which a heart emoji is generated and added to the virtual environment. The respective locations of the virtual display elements (corresponding to display modifications 420A-B) may be based on the user line-of-sight when the custom cue was detected. In other implementations, the location of the virtual display elements may correspond to an area indicated by the custom cue (e.g., where the custom cue includes pointing, encircling, nodding, etc.).

Figure 4B:
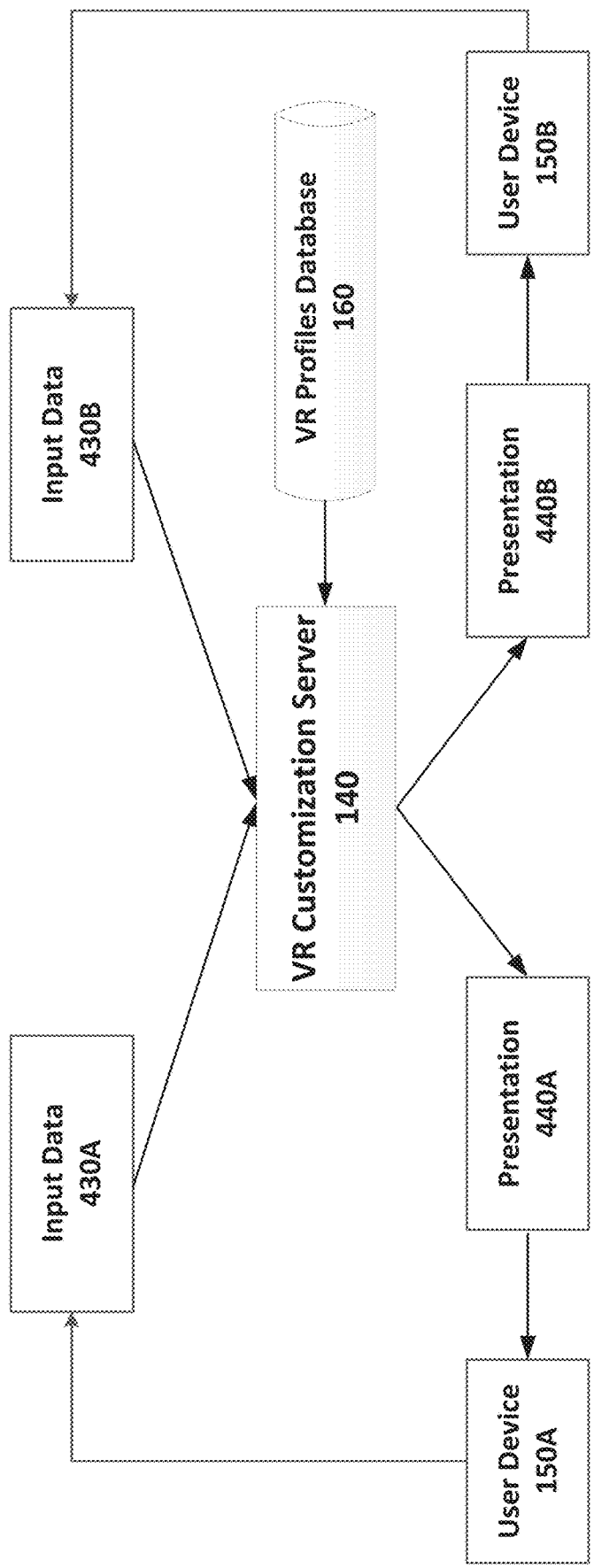
FIG. 4B is a diagram illustrating an exemplary implementation of personalized controls and communications in a virtual environment associated with multiple user devices.

FIG. 4B is a diagram illustrating an exemplary implementation of personalized controls and communications in a virtual environment associated with multiple user devices 150A-B. As illustrated, user devices 150A-B may respectively provide input data 430A and 430B to VR customization server 140 for analysis. Such input data 430A-B may include not only data regarding in-game activity by the user devices 150A-B, but may further include data regarding the respective real-world environments around user devices 150A-B. VR customization server 140 may obtain VR profiles associated with the user of user devices 150A-B and monitor incoming input data 430A-B for indications of the custom cues defined in each VR profile.

When the VR customization server 140 detects a custom cue (e.g., custom cue 410A) defined by the VR profile associated with user device 150A, the VR customization server 140 may then retrieve the associated instructions regarding display modification 420A. In some embodiments, the VR customization server 140 may execute the instructions to apply the display modification 420A to a current presentation 440A of the virtual environment provided to user device 150A. The VR customization server 140 may also provide the instructions to the user device 150A to execute and generate the display modification 420A within the current presentation 440A of the virtual environment.

In a network environment that includes multiple user devices 150A-B, the VR customization server 140 may concurrently perform similar services for each user device 150A-B to provide customized presentations 440A-B in accordance with the respective VR profiles. As a result, input data 430B that indicates a custom cue 410B may trigger VR customization server 140 to retrieve instructions for display modification 420B for execution, thereby resulting in a customization presentation 440B that is provided to user device 150B.

Figure 5:
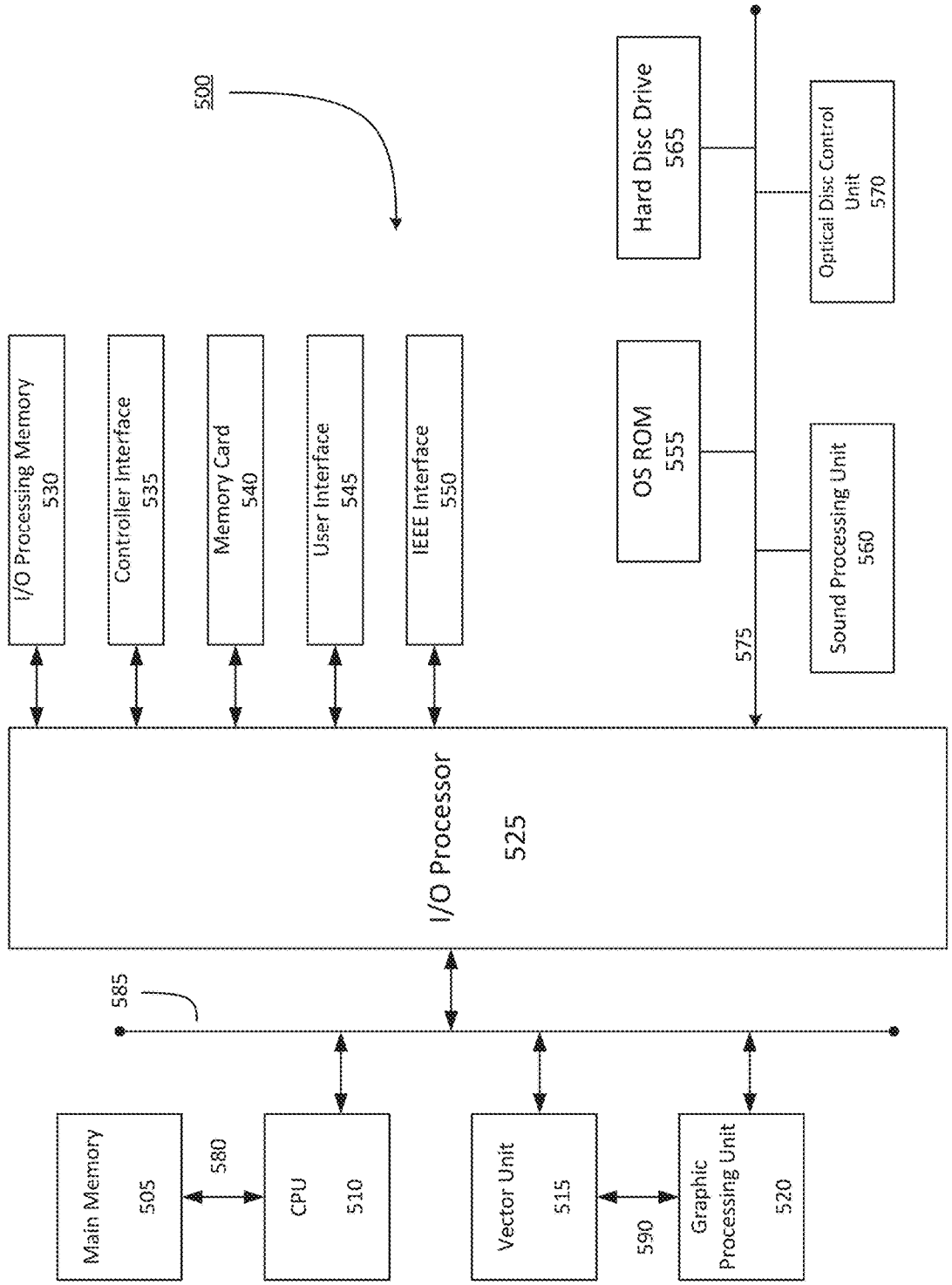
FIG. 5 is a block diagram of an exemplary electronic entertainment system that may be used in embodiments of the present invention.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 4$, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 1394 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for personalized controls and communications in virtual environments, the method comprising:
storing a virtual reality (VR) profile in memory for a user, wherein the VR profile specifies a cue associated with custom instructions executable to modify one or more virtual elements;
monitoring an interactive session associated with a current virtual environment in which the user is participating via a user device, wherein monitoring the interactive session is based on the VR profile stored for the user;
detecting that the cue specified by the VR profile is present in the monitored communication session, wherein the specified cue includes text from one or more other devices in the interactive session;
generating voiceover audio based on the text in real-time;
modifying the virtual elements within a presentation of the current virtual environment provided to the user device in accordance with the executable instructions associated with the cue specified by the VR profile of the user, wherein the presentation is modified to include the voiceover audio generated in real-time based on content associated with the one or more other devices; and
providing the modified presentation of the current virtual environment with generated voiceover audio to the user device.

2. The method of claim 1, wherein the specified cue includes a real-world movement by the user, and wherein detecting the specified cue is based on sensor information captured by the user device.

3. The method of claim 2, wherein the real-world movement includes a gesture in physical space, and wherein the sensor information is captured by a camera associated with the user device.

4. The method of claim 2, wherein the real-world movement includes a drawing gesture upon a touchpad of the user device, and wherein the sensor information is captured by the touchpad.

5. The method of claim 1, wherein at least one of the cue, a type of modification, and the virtual display elements is customizable by the user.

6. The method of claim 1, further comprising identifying the virtual elements within the current virtual environment based on eye-tracking data indicating that a line-of-sight of the user is directed at the virtual display elements within the virtual environment when the specified cue was detected.

7. The method of claim 6, wherein the current virtual environment includes one or more user input interfaces, and wherein modifying the virtual elements includes generating typed output when the specified cue is associated with the user input interfaces.

8. The method of claim 1, wherein the specified cue includes text from one or more other devices in the interactive session, and wherein modifying the virtual elements includes removing the text from the current virtual environment.

9. A system for personalized controls and communications in virtual environments, the system comprising:
  memory that stores a virtual reality (VR) profile for a user, wherein the VR profile specifies a cue associated with custom instructions executable to modify one or more virtual elements;
  a communication interface that communicates over a communication network, wherein the communication interface receives data regarding an interactive session associated with a current virtual environment in which the user is participating via a user device; and
  a processor that executes instructions stored in memory, wherein the processor executes the instructions to:
    monitor the interactive session based on the VR profile stored for the user,
    detect that the cue specified by the VR profile is present in the monitored communication session, wherein the specified cue includes text from one or more other devices in the interactive session,
    generate voiceover audio based on the text in real-time,
    modify the virtual elements within a presentation of the current virtual environment provided to the user device in accordance with the executable instructions associated with the cue specified by the VR profile of the user, wherein the presentation is modified to include the voiceover audio generated in real-time based on content associated with the one or more other devices, and
    provide the modified presentation of the current virtual environment with generated voiceover audio to the user device.

10. The system of claim 9, wherein the specified cue includes a real-world movement by the user, and wherein the processor detects the specified cue based on sensor information captured by the user device.

11. The system of claim 10, wherein the real-world movement includes a gesture in physical space, and wherein the sensor information is captured by a camera associated with the user device.

12. The system of claim 10, wherein the real-world movement includes a drawing gesture upon a touchpad of the user device, and wherein the sensor information is captured by the touchpad.

13. The system of claim 9, wherein at least one of the cue, a type of modification, and the virtual elements is customizable by the user.

14. The system of claim 9, wherein the processor executes further instructions to identify the virtual elements within the current virtual environment based on eye-tracking data indicating that a line-of-sight of the user is directed at the virtual elements within the virtual environment when the specified cue was detected.

15. The system of claim 14, wherein the current virtual environment includes one or more user input interfaces, and wherein the processor modifies the virtual elements by generating typed output when the specified cue is associated with the user input interfaces.

16. The system of claim 9, wherein the specified cue includes text from one or more other devices in the interactive session, and wherein the processor modifies the virtual elements by removing the text from the current virtual environment.

17. A non-transitory, computer-readable storage medium, having embodied thereon a program executable by a processor to perform a method for personalized controls and communications in virtual environments, the method comprising:
  storing a virtual reality (VR) profile in memory for a user, wherein the VR profile specifies a cue associated with custom instructions executable to modify one or more virtual elements;
  monitoring an interactive session associated with a current virtual environment in which the user is participating via a user device, wherein monitoring the interactive session is based on the VR profile stored for the user;
  detecting that the cue specified by the VR profile is present in the monitored communication session, wherein the specified cue includes text from one or more other devices in the interactive session;
  generating voiceover audio based on the text in real-time;
  modifying the virtual elements within a presentation of the current virtual environment provided to the user device in accordance with the executable instructions associated with the cue specified by the VR profile of the user, wherein the presentation is modified to include the voiceover audio generated in real-time based on content associated with the one or more other devices; and
  providing the modified presentation of the current virtual environment with generated voiceover audio to the user device.

* * * * *